(12) United States Patent (10) Patent No.: US 8,875,173 B2
Kilaru et al. (45) Date of Patent: Oct. 28, 2014

(54) MINING OF ADVERTISEMENT VIEWER INFORMATION USING MATRIX CODE

(75) Inventors: Kranti Kilaru, Castle Rock, CO (US); Keith Gerhards, Parker, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 759 days.

(21) Appl. No.: 12/965,645

(22) Filed: Dec. 10, 2010

(65) Prior Publication Data

US 2012/0151524 A1 Jun. 14, 2012

(51) Int. Cl.
| | |
|---|---|
| H04N 7/16 | (2011.01) |
| H04N 7/18 | (2006.01) |
| H04M 3/42 | (2006.01) |
| H04N 21/81 | (2011.01) |
| H04N 21/462 | (2011.01) |
| H04N 21/475 | (2011.01) |
| H04N 21/433 | (2011.01) |
| H04N 21/41 | (2011.01) |
| H04N 21/414 | (2011.01) |
| H04N 21/4223 | (2011.01) |
| H04N 21/858 | (2011.01) |
| H04N 21/466 | (2011.01) |
| H04N 21/4786 | (2011.01) |
| H04N 21/231 | (2011.01) |
| H04N 21/258 | (2011.01) |
| G06Q 30/02 | (2012.01) |
| H04N 21/45 | (2011.01) |

(52) U.S. Cl.
CPC ......... *G06Q 30/0241* (2013.01); *H04N 21/812* (2013.01); *H04N 21/4622* (2013.01); *H04N 21/4751* (2013.01); *H04N 21/4332* (2013.01); *H04N 21/4126* (2013.01); *H04N 21/41407* (2013.01); *H04N 21/4223* (2013.01); *H04N 21/8586* (2013.01); *H04N 21/4667* (2013.01); *H04N 21/4786* (2013.01); *H04N 21/23109* (2013.01); *H04N 21/25866* (2013.01); *H04N 21/4532* (2013.01); *G06Q 30/0277* (2013.01)
USPC .................... 725/32; 725/19; 725/51; 725/80

(58) Field of Classification Search
USPC ............................................... 725/19, 51, 80
See application file for complete search history.

(56) References Cited

U.S. PATENT DOCUMENTS

| | | | |
|---|---|---|---|
| 4,809,325 | A | 2/1989 | Hayashi et al. |
| 4,837,414 | A | 6/1989 | Edamula |

(Continued)

FOREIGN PATENT DOCUMENTS

| | | |
|---|---|---|
| CN | 1571503 A | 1/2005 |
| CN | 101 227 581 A | 7/2008 |

(Continued)

OTHER PUBLICATIONS

International Search Report and Written Opinion of PCT/US11/59977 mailed on Mar. 19, 2012, 7 pages.

(Continued)

*Primary Examiner* — Benjamin R Bruckart
*Assistant Examiner* — Carmine Malangone
(74) *Attorney, Agent, or Firm* — Kilpatrick Townsend & Stockton LLP (57) ABSTRACT

A method for collecting advertisement viewer information includes receiving a signal carrying a television advertisement, reading viewing data associated with the advertisement from a computer readable storage medium, compiling a matrix code including the viewing data for inclusion in the advertisement and scanning by a viewer, and transmitting the advertisement with the matrix code to a presentation device for display. A system for including advertisement viewer information in a matrix code is also described.

15 Claims, 3 Drawing Sheets

(56) References Cited

U.S. PATENT DOCUMENTS

| | | | |
|---|---|---|---|
| 5,500,681 A | 3/1996 | Jones | |
| 5,510,603 A | 4/1996 | Hess et al. | |
| 5,581,636 A | 12/1996 | Skinger | |
| 5,602,377 A | 2/1997 | Beller et al. | |
| 5,703,349 A | 12/1997 | Meyerson et al. | |
| 5,959,285 A | 9/1999 | Schuessler | |
| 5,978,855 A | 11/1999 | Metz et al. | |
| 6,006,990 A | 12/1999 | Ye et al. | |
| 6,058,238 A | 5/2000 | Ng | |
| 6,438,751 B1* | 8/2002 | Voyticky et al. | 725/42 |
| 6,512,919 B2 | 1/2003 | Ogasawara | |
| 6,556,273 B1 | 4/2003 | Wheeler et al. | |
| 6,704,929 B1* | 3/2004 | Ozer et al. | 725/13 |
| 6,983,304 B2 | 1/2006 | Sato | |
| 7,046,161 B2 | 5/2006 | Hayes | |
| 7,206,029 B2 | 4/2007 | Cohen-Solal | |
| 7,206,409 B2 | 4/2007 | Antonellis et al. | |
| 7,221,405 B2 | 5/2007 | Basson et al. | |
| 7,244,404 B2 | 7/2007 | Rosenberg et al. | |
| 7,328,848 B2 | 2/2008 | Xia et al. | |
| 7,349,668 B2 | 3/2008 | Ilan et al. | |
| 7,369,180 B2 | 5/2008 | Xing | |
| 7,387,250 B2 | 6/2008 | Muni | |
| 7,394,519 B1 | 7/2008 | Mossman et al. | |
| 7,424,976 B2 | 9/2008 | Muramatsu | |
| 7,443,449 B2 | 10/2008 | Momosaki et al. | |
| 7,487,527 B2 | 2/2009 | Ellis et al. | |
| 7,587,601 B2 | 9/2009 | Levy et al. | |
| 7,604,172 B2 | 10/2009 | Onogi | |
| 7,612,748 B2 | 11/2009 | Tateuchi | |
| 7,624,417 B2 | 11/2009 | Dua | |
| 7,624,916 B2 | 12/2009 | Sato et al. | |
| 7,673,297 B1 | 3/2010 | Arsenault et al. | |
| 7,797,430 B2 | 9/2010 | Ichieda | |
| 7,841,531 B2 | 11/2010 | Onogi | |
| 8,010,977 B2 | 8/2011 | Hogyoku | |
| 8,045,054 B2 | 10/2011 | Bishop et al. | |
| 8,186,572 B2 | 5/2012 | Herzig | |
| 8,292,166 B2 | 10/2012 | Gomez et al. | |
| 8,364,018 B2 | 1/2013 | McArdle | |
| 8,386,339 B2 | 2/2013 | Minnick et al. | |
| 8,408,466 B2 | 4/2013 | Gratton | |
| 8,427,455 B2 | 4/2013 | Matsuda | |
| 8,430,302 B2 | 4/2013 | Minnick et al. | |
| 8,439,257 B2 | 5/2013 | Beals et al. | |
| 8,443,407 B2 | 5/2013 | Gaede et al. | |
| 8,468,610 B2 | 6/2013 | Beals et al. | |
| 8,511,540 B2 | 8/2013 | Anguiano | |
| 8,534,540 B2 | 9/2013 | Gratton et al. | |
| 8,550,334 B2 | 10/2013 | Gratton et al. | |
| 8,553,146 B2 | 10/2013 | Kennedy | |
| 2001/0037297 A1 | 11/2001 | McNair | |
| 2001/0052133 A1 | 12/2001 | Pack et al. | |
| 2002/0027612 A1 | 3/2002 | Brill et al. | |
| 2002/0049980 A1 | 4/2002 | Hoang | |
| 2002/0112250 A1 | 8/2002 | Koplar et al. | |
| 2003/0018711 A1 | 1/2003 | Imanishi | |
| 2003/0050854 A1 | 3/2003 | Showghi et al. | |
| 2003/0121978 A1 | 7/2003 | Rubin et al. | |
| 2003/0172374 A1 | 9/2003 | Vinson et al. | |
| 2004/0019691 A1 | 1/2004 | Daymond et al. | |
| 2004/0026508 A1 | 2/2004 | Nakajima et al. | |
| 2004/0044532 A1 | 3/2004 | Karstens | |
| 2004/0046790 A1 | 3/2004 | Agarwal et al. | |
| 2005/0011958 A1 | 1/2005 | Fukasawa et al. | |
| 2005/0015800 A1 | 1/2005 | Holcomb | |
| 2005/0015815 A1 | 1/2005 | Shoff et al. | |
| 2005/0055281 A1 | 3/2005 | Williams | |
| 2005/0059339 A1 | 3/2005 | Honda et al. | |
| 2005/0125301 A1 | 6/2005 | Muni | |
| 2005/0149967 A1 | 7/2005 | Hanley et al. | |
| 2005/0180804 A1 | 8/2005 | Andrew et al. | |
| 2005/0262548 A1 | 11/2005 | Shimojo et al. | |
| 2005/0264694 A1 | 12/2005 | Ilan et al. | |
| 2006/0064700 A1 | 3/2006 | Ludvig et al. | |
| 2006/0071076 A1 | 4/2006 | Tamayama | |
| 2006/0079247 A1 | 4/2006 | Ritter | |
| 2006/0086796 A1 | 4/2006 | Onogi | |
| 2006/0095286 A1 | 5/2006 | Kimura | |
| 2006/0124742 A1 | 6/2006 | Rines et al. | |
| 2006/0196950 A1 | 9/2006 | Kiliccote | |
| 2006/0203339 A1 | 9/2006 | Kleinberger et al. | |
| 2006/0208088 A1 | 9/2006 | Sekiguchi | |
| 2006/0265731 A1 | 11/2006 | Matsuda | |
| 2007/0016934 A1 | 1/2007 | Okada et al. | |
| 2007/0016936 A1* | 1/2007 | Okada et al. | 725/136 |
| 2007/0017350 A1 | 1/2007 | Uehara | |
| 2007/0019215 A1 | 1/2007 | Yu | |
| 2007/0063050 A1 | 3/2007 | Attia et al. | |
| 2007/0073585 A1 | 3/2007 | Apple et al. | |
| 2007/0143788 A1 | 6/2007 | Abernathy et al. | |
| 2007/0192723 A1 | 8/2007 | Anzelde et al. | |
| 2007/0206020 A1 | 9/2007 | Duffield et al. | |
| 2007/0256118 A1 | 11/2007 | Nomura et al. | |
| 2008/0022323 A1 | 1/2008 | Koo | |
| 2008/0059998 A1 | 3/2008 | McClenny et al. | |
| 2008/0062164 A1 | 3/2008 | Bassi et al. | |
| 2008/0073434 A1 | 3/2008 | Epshteyn et al. | |
| 2008/0077324 A1 | 3/2008 | Hatano et al. | |
| 2008/0082684 A1 | 4/2008 | Gaos et al. | |
| 2008/0092154 A1 | 4/2008 | Hogyoku | |
| 2008/0112615 A1 | 5/2008 | Obrea et al. | |
| 2008/0156879 A1 | 7/2008 | Melick et al. | |
| 2008/0182561 A1 | 7/2008 | Kim et al. | |
| 2008/0189185 A1 | 8/2008 | Matsuo et al. | |
| 2008/0200153 A1* | 8/2008 | Fitzpatrick et al. | 455/414.1 |
| 2008/0200160 A1 | 8/2008 | Fitzpatrick et al. | |
| 2008/0201078 A1 | 8/2008 | Fitzpatrick et al. | |
| 2008/0244675 A1 | 10/2008 | Sako et al. | |
| 2008/0267537 A1 | 10/2008 | Thuries | |
| 2008/0281624 A1 | 11/2008 | Shibata | |
| 2008/0288600 A1 | 11/2008 | Clark | |
| 2008/0307348 A1 | 12/2008 | Jones et al. | |
| 2009/0029725 A1 | 1/2009 | Kindberg | |
| 2009/0031071 A1 | 1/2009 | Chiu | |
| 2009/0031373 A1 | 1/2009 | Hogyoku | |
| 2009/0070699 A1 | 3/2009 | Birkill et al. | |
| 2009/0083808 A1 | 3/2009 | Morrison | |
| 2009/0088213 A1 | 4/2009 | Rofougaran | |
| 2009/0094546 A1 | 4/2009 | Anzelde et al. | |
| 2009/0108057 A1 | 4/2009 | Mu et al. | |
| 2009/0113334 A1 | 4/2009 | Chakra et al. | |
| 2009/0154759 A1 | 6/2009 | Koskinen et al. | |
| 2009/0157511 A1 | 6/2009 | Spinnell et al. | |
| 2009/0157530 A1 | 6/2009 | Nagamoto et al. | |
| 2009/0172780 A1 | 7/2009 | Sukeda et al. | |
| 2009/0179852 A1 | 7/2009 | Refai et al. | |
| 2009/0180025 A1 | 7/2009 | Dawson | |
| 2009/0212112 A1 | 8/2009 | Li | |
| 2009/0212113 A1 | 8/2009 | Chiu et al. | |
| 2009/0234570 A1 | 9/2009 | Sever | |
| 2009/0254954 A1 | 10/2009 | Jeong | |
| 2009/0294538 A1 | 12/2009 | Wihlborg et al. | |
| 2009/0303036 A1 | 12/2009 | Sahuguet | |
| 2009/0307232 A1 | 12/2009 | Hall | |
| 2009/0312105 A1 | 12/2009 | Koplar | |
| 2010/0017457 A1 | 1/2010 | Jumpertz et al. | |
| 2010/0020970 A1 | 1/2010 | Liu et al. | |
| 2010/0031162 A1 | 2/2010 | Wiser et al. | |
| 2010/0036936 A1 | 2/2010 | Cox et al. | |
| 2010/0053339 A1 | 3/2010 | Aaron et al. | |
| 2010/0081375 A1 | 4/2010 | Rosenblatt et al. | |
| 2010/0089996 A1 | 4/2010 | Koplar | |
| 2010/0096448 A1 | 4/2010 | Melick et al. | |
| 2010/0103018 A1 | 4/2010 | Yoon et al. | |
| 2010/0114715 A1* | 5/2010 | Schuster et al. | 705/14.69 |
| 2010/0129057 A1 | 5/2010 | Kulkarni | |
| 2010/0131900 A1 | 5/2010 | Spetalnick | |
| 2010/0131970 A1 | 5/2010 | Falcon | |
| 2010/0131983 A1 | 5/2010 | Shannon et al. | |
| 2010/0149187 A1 | 6/2010 | Slavin et al. | |
| 2010/0154035 A1 | 6/2010 | Damola et al. | |
| 2010/0161437 A1 | 6/2010 | Pandey | |
| 2010/0163613 A1 | 7/2010 | Bucher et al. | |

(56) References Cited

U.S. PATENT DOCUMENTS

| | | | |
|---|---|---|---|
| 2010/0201894 A1 | 8/2010 | Nakayama et al. |
| 2010/0217663 A1 | 8/2010 | Ramer et al. |
| 2010/0225653 A1 | 9/2010 | Sao et al. |
| 2010/0261454 A1 | 10/2010 | Shenfield et al. |
| 2010/0262924 A1 | 10/2010 | Kalu |
| 2010/0262992 A1 | 10/2010 | Casagrande |
| 2010/0272193 A1 | 10/2010 | Khan et al. |
| 2010/0275010 A1 | 10/2010 | Ghirardi |
| 2010/0279710 A1 | 11/2010 | Dicke et al. |
| 2010/0295868 A1 | 11/2010 | Zahnert et al. |
| 2010/0301115 A1 | 12/2010 | Berkun |
| 2010/0313231 A1 | 12/2010 | Okamoto et al. |
| 2010/0319041 A1 | 12/2010 | Ellis |
| 2010/0327060 A1 | 12/2010 | Moran et al. |
| 2011/0000958 A1 | 1/2011 | Herzig |
| 2011/0007218 A1 | 1/2011 | Moran et al. |
| 2011/0030068 A1 | 2/2011 | Imai |
| 2011/0039573 A1 | 2/2011 | Hardie |
| 2011/0061003 A1 | 3/2011 | Miyazawa et al. |
| 2011/0065451 A1 | 3/2011 | Danado et al. |
| 2011/0087539 A1 | 4/2011 | Rubinstein et al. |
| 2011/0107386 A1 | 5/2011 | De Los Reyes et al. |
| 2011/0138408 A1* | 6/2011 | Adimatyam et al. ........... 725/14 |
| 2011/0208710 A1 | 8/2011 | Lesavich |
| 2011/0258058 A1 | 10/2011 | Carroll et al. |
| 2011/0264527 A1 | 10/2011 | Fitzpatrick et al. |
| 2011/0264530 A1 | 10/2011 | Santangelo et al. |
| 2011/0282727 A1 | 11/2011 | Phan et al. |
| 2011/0314485 A1 | 12/2011 | Abed |
| 2012/0096499 A1 | 4/2012 | Dasher et al. |
| 2012/0127110 A1 | 5/2012 | Amm et al. |
| 2012/0128267 A1 | 5/2012 | Dugan et al. |
| 2012/0130835 A1 | 5/2012 | Fan et al. |
| 2012/0130851 A1 | 5/2012 | Minnick et al. |
| 2012/0131416 A1 | 5/2012 | Dugan et al. |
| 2012/0137318 A1 | 5/2012 | Kilaru et al. |
| 2012/0138671 A1 | 6/2012 | Gaede et al. |
| 2012/0139826 A1 | 6/2012 | Beals et al. |
| 2012/0139835 A1 | 6/2012 | Morrison et al. |
| 2012/0142322 A1 | 6/2012 | Gomez |
| 2012/0151293 A1 | 6/2012 | Beals |
| 2012/0153015 A1 | 6/2012 | Gomez et al. |
| 2012/0153017 A1 | 6/2012 | Bracalente et al. |
| 2012/0155838 A1 | 6/2012 | Gerhards et al. |
| 2012/0158919 A1 | 6/2012 | Aggarwal et al. |
| 2012/0159563 A1 | 6/2012 | Gomez et al. |
| 2012/0168493 A1 | 7/2012 | Worms |
| 2012/0168510 A1 | 7/2012 | Gratton |
| 2012/0169928 A1 | 7/2012 | Casagrande et al. |
| 2012/0175416 A1 | 7/2012 | Gomez et al. |
| 2012/0181329 A1 | 7/2012 | Gratton et al. |
| 2012/0182320 A1 | 7/2012 | Beals et al. |
| 2012/0188112 A1 | 7/2012 | Beals et al. |
| 2012/0188442 A1 | 7/2012 | Kennedy |
| 2012/0198572 A1 | 8/2012 | Beals et al. |
| 2012/0199643 A1 | 8/2012 | Minnick et al. |
| 2012/0206648 A1 | 8/2012 | Casagrande et al. |
| 2012/0215830 A1 | 8/2012 | Anguiano |
| 2012/0217292 A1 | 8/2012 | Gratton et al. |
| 2012/0217293 A1 | 8/2012 | Martch et al. |
| 2012/0218470 A1 | 8/2012 | Schaefer |
| 2012/0218471 A1 | 8/2012 | Gratton |
| 2012/0222055 A1 | 8/2012 | Schaefer et al. |
| 2012/0222071 A1 | 8/2012 | Gaede et al. |
| 2012/0222081 A1 | 8/2012 | Schaefer et al. |
| 2012/0293327 A1 | 11/2012 | Mountain |
| 2013/0068838 A1 | 3/2013 | Gomez et al. |
| 2014/0076963 A1 | 3/2014 | Gratton et al. |

FOREIGN PATENT DOCUMENTS

| | | |
|---|---|---|
| DE | 10 2007 038 810 A1 | 2/2009 |
| EP | 1 021 035 A1 | 7/2000 |
| EP | 1 383 071 A2 | 1/2004 |
| EP | 1 724 695 A1 | 11/2006 |
| EP | 1 757 222 A1 | 2/2007 |
| EP | 1 768 400 A2 | 3/2007 |
| EP | 2 079 051 A1 | 7/2009 |
| EP | 2 131 289 A1 | 12/2009 |
| EP | 2 439 936 A2 | 4/2012 |
| FR | 2 565 748 A1 | 12/1985 |
| GB | 2 044 446 A | 10/1980 |
| GB | 2 165 129 A | 4/1986 |
| GB | 2 311 451 A | 9/1997 |
| GB | 2 325 765 A | 12/1998 |
| GB | 2 47 567 A | 1/2011 |
| JP | 2002-215768 A | 8/2002 |
| JP | 2007-213548 A | 8/2007 |
| JP | 2008 244556 A | 10/2008 |
| KR | 2004 0087776 A | 10/2004 |
| WO | 95/27275 A1 | 10/1995 |
| WO | 97/41690 A1 | 11/1997 |
| WO | 01/06593 A2 | 1/2001 |
| WO | 01/18589 A1 | 3/2001 |
| WO | 2005/109338 A1 | 11/2005 |
| WO | 2007/009005 A1 | 1/2007 |
| WO | 2009/057651 | 5/2009 |
| WO | 2009/144536 A1 | 12/2009 |
| WO | 2010/149161 A1 | 12/2010 |
| WO | 2011/009055 A2 | 1/2011 |
| WO | 01/58146 A2 | 8/2011 |

OTHER PUBLICATIONS

International Search Report and Written Opinion of PCT/US11/60002 mailed on Feb. 15, 2012, 7 pages.
International Search Report and Written Opinion of PCT/US11/60104 mailed on Mar. 29, 2012, 9 pages.
International Search Report and Written Opinion of PCT/US11/60121 mailed on Feb. 14, 2012, 7 pages.
International Search Report and Written Opinion of PCT/US11/61074 mailed on Jan. 6, 2012, 11 pages.
International Search Report and Written Opinion of PCT/US11/61211 mailed on Mar. 29, 2012, 8 pages.
International Search Report and Written Opinion of PCT/US11/61773 mailed on Feb. 21, 2012, 7 pages.
International Search Report and Written Opinion of PCT/US11/61778 mailed on Mar. 2, 2012, 7 pages.
International Search Report and Written Opinion of PCT/US11/63111 mailed on Apr. 4, 2012, 9 pages.
International Search Report and Written Opinion of PCT/US11/64709 mailed on Apr. 10, 2012, 8 pages.
International Search Report and Written Opinion of PCT/US2011/060098 mailed on Mar. 29, 2012, 10 pages.
International Search Report and Written Opinion of PCT/US2011/063308 mailed on Mar. 29, 2012, 10 pages.
International Search Report and Written Opinion of PCT/US2011/068176 mailed on Mar. 29, 2012, 15 pages.
Ngee, S., "Data Transmission Between PDA and PC Using WiFi for Pocket Barcode Application," Thesis, University Teknologi Malaysia, May 2007, 126 pp. Found online at http://eprints.utm.my/6421/1/SeahYeowNgeeMFKE20007TTT.pdf, Oct. 22, 2010.
U.S. Appl. No. 12/961,369, filed Dec. 6, 2010, Office Action mailed Mar. 9, 2012, 17 pages.
U.S. Appl. No. 12/971,349, filed Dec. 17, 2010, Office Action mailed Nov. 10, 2011, 9 pages.
U.S. Appl. No. 12/971,349, filed Dec. 17, 2010, Final Office Action mailed Jan. 20, 2012, 10 pages.
U.S. Appl. No. 12/986,721, filed Jan. 7, 2011, Office Action mailed Mar. 16, 2012, 6 pages.
"Android App Reviews & Showcase Just a Tapp Away," Android Tapp, 10 pp. Found online at http://www.androidtapp.com/download-the-weather-channel-android-app-from-your-tv/, Oct. 22, 2010.
"Can Mobile Barcodes Work on TV?," India and Asia Pacific Mobile Industry Reports, Sep. 2009, 4 pp. Found online at http://www.gomonews.com/can-mobile-barcodes-work-on-tv/, Oct. 22, 2010.
"Fox TV Uses QR Codes," 2d Barcode Strategy, Sep. 2010, 6 pp. Found online at http://www.2dbarcodestrategy.com/2010/09/fox-tv-uses-qr-codes.html, Oct. 22, 2010.

(56) References Cited

OTHER PUBLICATIONS

"Fox's Fringe Uses QR Code," 2d Barcode Strategy, Oct. 2010, 4 pp. Found on the Internet at http://www.2dbarcodestrategy.com/2010/10/foxs-fringe-uses-qr-code.html, Oct. 22, 2010.

"Mobile Paths: QR Codes Come to TV," Mobile Behavior: An Omnicom Group Company, Sep. 2010, 8 pp. Found online at http://www.mobilebehavior.com/2010/09/27/mobile-paths-qr-codes-come-to-tv, Oct. 22, 2010.

"What Can I Do with the QR Barcode," Search Magnet Local-QR Barcode Technology, 2 pp. Found online at http://www.searchmagnetlocal.com/qr_barcode_technology.html, Oct. 22, 2010.

Kartina Costedio, "Bluefly QR Codes Debut on TV," 2 pp. Found online at http://www.barcode.com/Mobile-Barcode-News/bluefly-qr-codes-debut-on-tv.html, Oct. 22, 2010.

Gao, J. et al., "A 2D Barcode-Based Mobile Payment System," Multimedia and Ubiquitous Engineering, 2009, 10 pp. Found online at http://ieeexplore.ieee.org/Xplore/login.jsp?url=http%3A%2F%2Fieeexplore.ieee.org%2Fie . . . , Oct. 22, 2010.

Smith, Lindsay, "Barcodes Make History on Global TV", 3 pp. Found online at http://www.lindsaysmith.com/worlds-first-mobio-mini-telethon/, Oct. 22, 2010.

Nghee, Seah Y. , "Data Transmission Between PDA and PC Using WIFI for Pocket Barcode Application", Thesis, University Teknologi Malaysia, May 2007, 126 pp. Found online at http://eprints.utm.my/6421/1/SeahYeowNgeeMFKE20007TTT.pdf, Oct. 22, 2010.

Olson, Elizabeth, "Bar Codes Add Detail on Items in TV Ads," New York Times, Sep. 2010, 3 pp. Found online at http://www.nytimes.com/2010/09/27/business/media/27bluefly.html?src=busIn, Oct. 22, 2010.

Rekimoto, Jun et al., "Augment-able Reality: Situated Communication Through Physical and Digital Spaces", Sony Computer Science Laboratory, 2002, 8 pp. Found online at Citeseer: 10.1.1.20.34[1].pdf, Oct. 22, 2010.

Silverstein, Barry, "QR Codes and TV Campaigns Connect," ReveNews, Sep. 2010, 5 pp. Found online at htto://www.revenews.com/barrysilverstein/qr-codes-and-tv-campaigns-connect/, Oct. 22, 2010.

Yamanari, Tomofumi et al., "Electronic Invisible Code Display Unit for Group Work on Reminiscence Therapy," Proceedings of the International MultiConference of Engineers and Computer Scientists 2009, vol. I, IMECS 2009, Mar. 2009, 6 pp. Retrieved from Internet: http://citeseerx.ist.psu.edu/viewdoc/download?doi=10.1.1.148.6904&rep1&type=pdf.

Byford, D., "Universal Interactive Device," International Business Machines Corporation, Jun. 1998, 1 page.

International Search Report and Written Opinion of PCT/US11/60094 mailed on Mar. 30, 2012, 7 pages.

International Search Report of PCT/US11/60109 mailed on Feb. 14, 2012, 3 pages.

International Search Report and Written Opinion of PCT/US2011/068161 mailed on Jun. 14, 2012, 19 pages.

International Search Report and Written Opinion of PCT/US2012/021657 mailed on May 23, 2012, 12 pages.

International Search Report and Written Opinion of PCT/US2012/022405 mailed on Apr. 19, 2012, 11 pages.

International Search Report and Written Opinion of PCT/US2012/024923 mailed on May 22, 2012, 12 pages.

International Search Report and Written Opinion of PCT/US2012/024956 mailed on Jun. 11, 2012, 10 pages.

International Search Report and Written Opinion of PCT/US2012/025502 mailed Jun. 8, 2012, 13 pages.

International Search Report and Written Opinion of PCT/US2012/025607 mailed Jun. 8, 2012, 13 pages.

International Search Report and Written Opinion of PCT/US2012/025634 mailed on May 7, 2012, 8 pages.

International Search Report and Written Opinion of PCT/US2012/026373 mailed Jun. 13, 2012, 14 pages.

International Search Report and Written Opinion of PCT/US2012/026722 mailed Jun. 28, 2012, 11 pages.

Schmitz, A., et al., "Ad-Hoc Multi-Displays for Mobile Interactive Applications," 31st Annual Conference of the European Association for Computer Graphics (Eurographics 2010), May 2010, vol. 29, No. 2, 8 pages.

Yang, C., et al., "Embedded Digital Information Integrated by Video-on-Demand System," Proceedings of the Fourth International Conference on Networked Computing and Advanced Information Management, IEEE Computer Society, 2008, 6 pages.

U.S. Appl. No. 12/971,349, filed Dec. 17, 2010, Office Action mailed Jul. 16, 2012, 11 pages.

U.S. Appl. No. 12/984,385, filed Jan. 4, 2011, Office Action mailed Jul. 12, 2012, 16 pages.

U.S. Appl. No. 12/986,721, filed Jan. 7, 2011, Notice of Allowance mailed Jun. 21, 2012, 7 pages.

U.S. Appl. No. 13/020,678, filed Feb. 3, 2011, Office Action mailed Jul. 30, 2012, 15 pages.

U.S. Appl. No. 13/035,525, filed Feb. 25, 2011, Office Action mailed Jul. 18, 2012, 15 pages.

International Preliminary Report on Patentability of PCT/US2011/059977 mailed on Jun. 6, 2013, 6 pages.

International Preliminary Report on Patentability of PCT/US2011/068161 mailed on Jul. 25, 2013, 13 pages.

International Preliminary Report on Patentability of PCT/US2012/025502 mailed Sep. 6, 2013, 9 pages.

Liu, Yue et al., "Recognition of QR code with mobile phones," Control and Decision Conference, 2008. CCDC 2008. Jul. 2-4, 2008, pp. 203, 206.

U.S. Appl. No. 12/964,478, filed Dec. 9, 2010, Final Office Action mailed Sep. 16, 2013, 12 pages.

U.S. Appl. No. 12/961,369, filed Dec. 6, 2010, Non-Final Office Action mailed Jul. 12, 2013, 22 pages.

U.S. Appl. No. 12/971,349, filed Dec. 7, 2010, Notice of Allowance mailed Oct. 2, 2013, 24 pages.

U.S. Appl. No. 12/981,244, filed Dec. 29, 2010, Final Office Action mailed Oct. 30, 2013, 10 pages.

U.S. Appl. No. 13/016,483, filed Jan. 28, 2011 Final Office Action mailed Jun. 27, 2013, 13 pages.

U.S. Appl. No. 12/973,431, filed Dec. 20, 2010, Final Office Action mailed Aug. 27, 2013, 11 pages.

U.S. Appl. No. 13/006,270, filed Jan. 13, 2011, Non-Final Office Action mailed Oct. 8, 2013, 20 pages.

U.S. Appl. No. 13/028,030, filed Feb. 15, 2011, Non-Final Office Action mailed Dec. 17, 2013, 60 pages.

U.S. Appl. No. 13/035,525, filed Feb. 25, 2011, Final Office Action mailed Sep. 12, 2013, 21 pages.

U.S. Appl. No. 13/037,302, filed Feb. 28, 2011 Final Office Action mailed Oct. 16, 2013, 28 pages.

U.S. Appl. No. 13/037,316, filed Feb. 28, 2011, Final Office Action mailed Aug. 28, 2013, 13 pages.

U.S. Appl. No. 13/192,287, filed Jul. 27, 2011 Non Final Office Action mailed Jun. 13, 2013, 22 pages.

U.S. Appl. No. 13/673,480, filed Nov. 9, 2012 Final Office Action mailed Sep. 9, 2013, 10 pages.

U.S. Appl. No. 13/673,480, filed Nov. 9, 2012 Notice of Allowance mailed Nov. 12, 2013, 16 pages.

U.S. Appl. No. 13/475,794, filed May 18, 2012 Non-Final Office Action mailed Sep. 18, 2013, 19 pages.

U.S. Appl. No. 12/961,369, filed Dec. 6, 2010, Non-Final Office Action mailed Feb. 13, 2014, 21 pages.

U.S. Appl. No. 13/010,557, filed Jan. 20, 2011, Final Rejection mailed Jan. 16, 2014, 17 pages.

U.S. Appl. No. 13/192,287, filed Jul. 27, 2011, Final Office Action mailed Jan. 28, 2014, 18 pages.

U.S. Appl. No. 13/035,474, filed Feb. 25, 2011, Non Final Rejection mailed Mar. 6, 2014, 20 pages.

U.S. Appl. No. 12/964,478, filed Dec. 9, 2010, Non-Final Office Action mailed Mar. 26, 2013, 19 pages.

U.S. Appl. No. 12/961,369, filed Dec. 6, 2010, Non-Final Office Action mailed Mar. 25, 2013, 17 pages.

U.S. Appl. No. 12/953,227, filed Nov. 23, 2010, Final Office Action mailed May 24, 2013, 17 pages.

(56) References Cited

OTHER PUBLICATIONS

U.S. Appl. No. 12/973,431, filed Dec. 20, 2010, Non-Final Rejection mailed May 15, 2013, 30 pages.
U.S. Appl. No. 13/014,591, Notice of Allowance mailed May 24, 2013, 32 pages.
U.S. Appl. No. 13/007,317, Notice of Allowance mailed May 13, 2013, 16 pages.
U.S. Appl. No. 13/031,115, Notice of Allowance mailed Apr. 16, 2013, 24 pages.
U.S. Appl. No. 13/034,482, filed Feb. 24, 2011, Final Office Action mailed Apr. 25, 2013, 19 pages.
U.S. Appl. No. 13/035,474, filed Feb. 25, 2011, Final Rejection mailed Mar. 29, 2013, 20 pages.
U.S. Appl. No. 12/960,285, filed Dec. 3, 2010, Final Office Action mailed Apr. 18, 2013, 14 pages.
U.S. Appl. No. 13/035,525, filed Feb. 25, 2011, Non-Final Office Action mailed May 15, 2013, 15 pages.
Extended European Search Report for EP 12152690.9 dated Jun. 19, 2012, 9 pages.
International Search Report of PCT/US2012/022581 mailed on Oct. 8, 2012, 18 pages.
International Search Report and Written Opinion of PCT/US2012/026624 mailed Aug. 29, 2012, 14 pages.
International Search Report and Written Opinion of PCT/US2012/048032, mailed Oct. 16, 2012, 14 pages.
O'Sullivan, Can Mobile Barcodes Work on TV?, India and Asia Pacific Mobile Industry Report, Sep. 2009, 4 pp. Found online at http://gomonews.com/can-mobile-barcodes-work-on-tv/, Feb. 5, 2013.
U.S. Appl. No. 12/958,073, filed Dec. 1, 2010, Office Action mailed Aug. 31, 2012, 12 pages.
U.S. Appl. No. 12/958,073, filed Dec. 1, 2010, Notice of Allowance mailed Jan. 17, 2013, 17 pages.
U.S. Appl. No. 12/961,369, filed Dec. 6, 2010, Final Rejection mailed Oct. 30, 2012, 17 pages.
U.S. Appl. No. 12/971,349, filed Dec. 7, 2010, Final Rejection mailed Oct. 24, 2012, 11 pages.
U.S. Appl. No. 12/981,244, filed Dec. 29, 2010, Office Action mailed Dec. 21, 2012, 23 pages.
U.S. Appl. No. 12/984,385, filed Jan. 4, 2011, Notice of Allowance mailed Nov. 28, 2012, 11 pages.
U.S. Appl. No. 12/953,227, filed Nov. 23, 2010, Office Action mailed Nov. 7, 2012, 31 pages.
U.S. Appl. No. 13/015,382, filed Jan. 27, 2011, Office Action Mailed Nov. 13, 2012, 7 pages.
U.S. Appl. No. 13/015,382, filed Jan. 27, 2011, Notice of Allowance mailed Feb. 22, 2013, 12 pages.
U.S. Appl. No. 13/016,483, filed Jan. 28, 2011 Office Action mailed Nov. 2, 2012, 18 pages.
U.S. Appl. No. 12/953,273, filed Nov. 23, 2010, Notice of Allowance, mailed Oct. 18, 2012, 11 pages.
U.S. Appl. No. 13/007,317, filed Jan. 14, 2011, Office action mailed Dec. 19, 2012, 29 pages.
U.S. Appl. No. 13/020,678, filed Feb. 3, 2011, Notice of Allowance mailed Jan. 3, 2013, 13 pages.
U.S. Appl. No. 13/028,030, filed Feb. 15, 2011, Office Action mailed Jan. 11, 2013, 14 pages.
U.S. Appl. No. 13/034,482, filed Feb. 24, 2011, Office Action mailed Oct. 19, 2012, 11 pages.
U.S. Appl. No. 13/035,474, filed Feb. 25, 2011, Office Action mailed Oct. 30, 2012, 11 pages.
U.S. Appl. No. 12/960,285, filed Dec. 3, 2010, Non-Final Office Action mailed Dec. 6, 2012, 17 pages.
U.S. Appl. No. 13/035,525, filed Feb. 25, 2011, Final Office Action mailed Jan. 31, 2013, 26 pages.
U.S. Appl. No. 13/037,302, filed Feb. 28, 2011 Office Action mailed Mar. 1, 2013, 20 pages.
U.S. Appl. No. 13/037,312, filed Feb. 28, 2011, Office Action mailed Aug. 15, 2012, 9 pages.
U.S. Appl. No. 13/037,312, filed Feb. 28, 2011, Final Office Action mailed Feb. 28, 2013, 18 pages.
U.S. Appl. No. 13/037,316, filed Feb. 28, 2011, Office Action mailed Jan. 30, 2013, 21 pages.
U.S. Appl. No. 13/037,333, filed Feb. 28, 2011 Notice of Allowance mailed Jan. 18, 2013, 27 pages.
U.S. Appl. No. 13/673,480, filed Nov. 9, 2012 Office Action mailed Jan. 16, 2013, 27 pages.

* cited by examiner

MINING OF ADVERTISEMENT VIEWER INFORMATION USING MATRIX CODE

FIELD OF THE INVENTION

This disclosure relates generally to mining of advertisement viewer data. More particularly, the mined data may be available in a displayed matrix code for scanning by a viewer allowing for collection of the data.

SUMMARY

In one embodiment, a method for collecting advertisement viewer information may include receiving a signal carrying a television advertisement, reading viewing data associated with the advertisement from a computer readable storage medium, compiling a matrix code including the viewing data for inclusion in the advertisement and scanning by a viewer, and transmitting the advertisement with the matrix code to a presentation device for display. The viewing data may, for example, include program information relating to a program within which the advertisement is run and more particularly may include information regarding the location of the advertisement within the program. The matrix code may also include advertisement data that may, for example, allow a viewer who has scanned the matrix code with a reader to receive additional information or incentives about an advertised product. The viewing data may allow for collection of information regarding advertisement viewing habits.

In another embodiment, a system for including advertisement viewer information in a matrix code may include a receiver. The receiver may include an input that receives a signal including a television advertisement. The receiver may also include a computer readable storage medium having viewing data stored therein associated with the advertisement and instructions for compiling matrix codes to include the viewing data. The receiver may also include a processor that receives the advertisement, reads the viewing data from the computer readable storage medium, and performs the instructions to compile matrix codes to include the viewing data. The receiver may also include an output that transmits the advertisement to a presentation device.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

DETAILED DESCRIPTION OF THE EMBODIMENTS

The description that follows includes sample systems, methods, and computer program products that embody various elements of the present disclosure. However, it should be understood that the described disclosure may be practiced in a variety of forms in addition to those described herein.

Television advertising continues to be an effective way for manufacturers and service providers to communicate with the public and maintain their products and services at the forefront of the minds of consumers. The cost of television advertising is often based on a viewer rating system. That is, for example, a television network may charge a higher price for a television commercial that runs during a television program that has a higher number of viewers and may not be able to charge as high a price for commercials running during less watched programs. Several ratings systems, in the U.S. and across the world, are relied upon by the networks to establish a basis for which they charge for advertising.

Current television ratings systems are based on a variety of forms of input. The Nielsen ratings, for example, are based on a combination of data collection from diaries, set meters, and people meters. The diaries are provided to a sample population who record what they are watching and then return the diaries for incorporation of the data into a statistical model. The diaries are generally limited to larger sections of time, such as a programming hour. The set meters are electronic devices that monitor channel changes and programs being watched on a minute to minute basis. These devices are also provided to a sample population and provide data to the ratings organization through a phone line, for example. People meters allow the ratings to be more fully delineated by demographics. That is, while a set meter may merely reflect what is being watched in a given household, a people meter may be able to define who within that household is watching.

While the current systems have been improved and continue to provide better information regarding how many people are watching and who is watching, there is still a need for better and more accurate information. For example, while the current data collecting devices described may provide information regarding who is watching and when, these methods do not indicate whether someone is being attentive to the program for its full length or how attentively they are watching. Moreover, many current systems do not determine what types of products a particular household or person is interested in.

The present disclosure relates to systems and methods for collecting viewer information regarding viewers who are actively engaged with a television advertisement. A scannable code, for example a bar code or matrix code, may be displayed during a television commercial for scanning by a viewer. There may be a suggestion in the commercial that scanning the matrix code will allow the viewer to access additional information about the product being advertised. The viewer may use a smartphone, for example, to scan the code on the television screen and the information contained in the code may direct their smartphone to a website having details of the advertised product, coupons, incentives, or other items of interest for the viewer.

The interaction of the viewer with the television program may reflect that the viewer is not only tuned to a particular program, but also actively engaged and attentive. In an effort to obtain information for purposes of ratings or other uses, the code that is presented for scanning by the viewer may contain several additional pieces of information. For example, the code may contain information about the household where the code was scanned, the time, the date, the program being watched, or whether the program was being watched live or time shifted via a digital video recorder, for example. Additional information may include when or where, within the program, the code was scanned. That is, information regarding whether the advertisement was near the beginning, middle, or end of the program being watched may be provided. This data may allow content providers (such as networks and satellite programming distributors) to refine their billing practices and more strategically price commercials within their programs and may further allow for targeted advertising.

Figure 1:
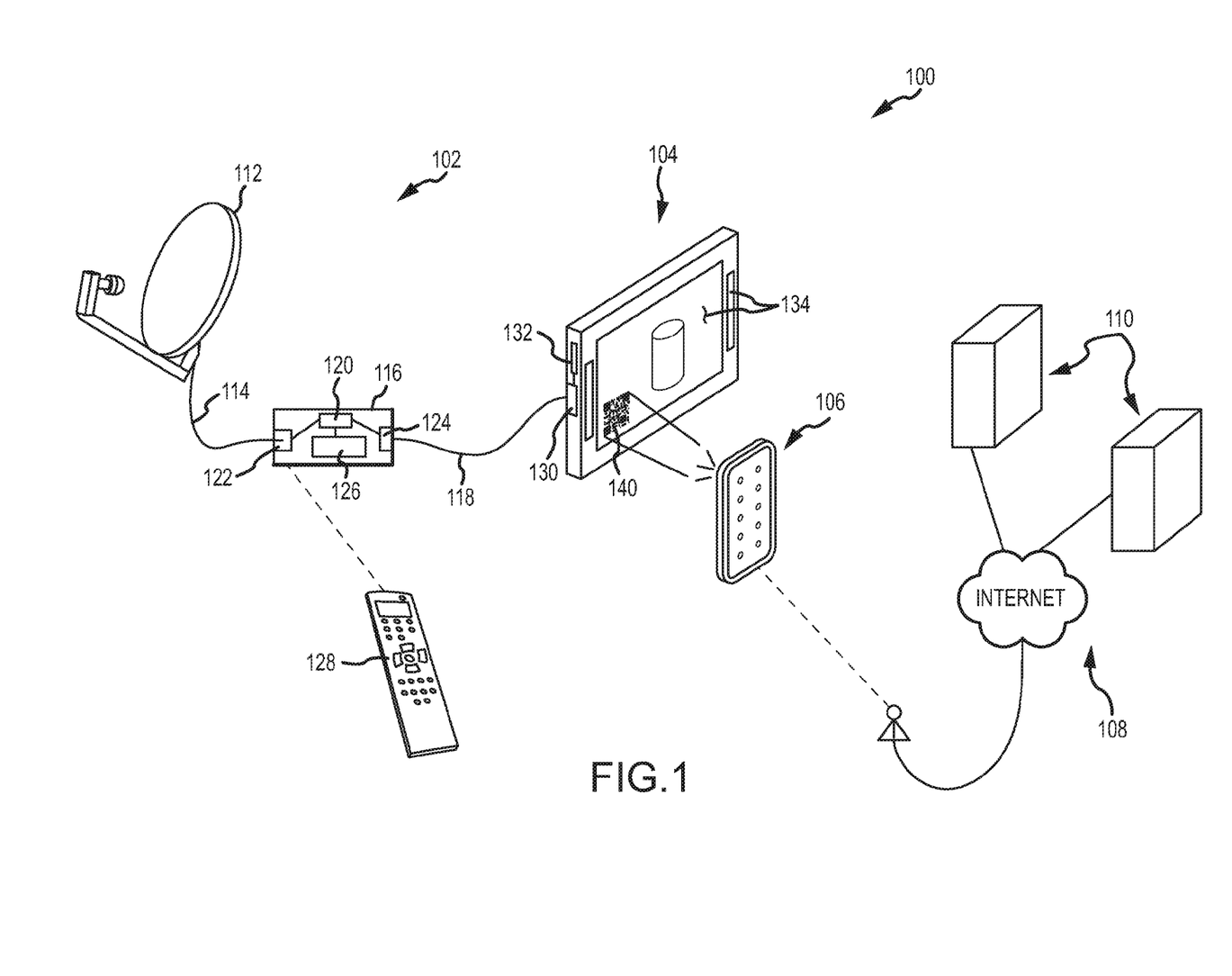
FIG. 1 is a diagram illustrating a system for mining advertisement viewer data.

Referring now to FIG. 1, a system 100 for collecting viewer data is shown. As shown, the system 100 may include a receiver 102 for receiving broadcast television programs. The system 100 may also include a presentation device 104 for displaying broadcast television programs. The system 100 may also include a reader 106 for reading information displayed on the presentation device. The reader may be in communication with a network 108 supported by one or more servers 110 for processing the information read from presentation device 104.

The receiver 102 may be configured to receive a signal carrying a broadcast television program, a program guide, a menu, or other display. The receiver 102 may further be configured for transmitting the display to the presentation device 104 for viewing. As such, the receiver 102 may be in the form of a set top box 116, part of a satellite system as shown including a dish 112, cabling 114 leading to the set top box 116, and cabling 118 leading to the presentation device 104, for example. Other examples of a receiver 102 may include an antenna system employing an analog or digital antenna connected by cabling leading either to a television receiver or directly to the presentation device 104. Still other examples may include a cable system including an incoming cable leading directly to a presentation device 104 or to a presentation device via a set top box.

In some embodiments, the receiver 102 may be configured to convert, configure, or otherwise modify the display prior to transmitting it to the presentation device for viewing. The receiver may further be configured for storing and displaying program information. The receiver may thus be in the form of a computer-type device having one or more processing units 120, one or more inputs 122, one or more outputs 124, and one or more computer readable storage media 126 (which may take the form of, but is not limited to: a magnetic storage medium; optical storage medium; magneto-optical storage medium; read only memory; random access memory; erasable programmable memory; flash memory; non-transitory storage media; and so on).

In some embodiments, these computer-type elements may be incorporated into a set top box 116 for receiving a broadcast, program guide information, audio and video streams, or other information. The set top box 116 may receive the information through the one or more inputs 122, process or store the incoming information, and selectively output information to the presentation device 104 for viewing and interaction by a viewer. For example, the viewer may select which television channel they would like to watch or select from time-shifted television programs stored in the storage medium, for example. In another example, the viewer may navigate the program guide or other series of menus, which may be output to the presentation device 104. Instructions executed by the processor 120 may be stored in the storage medium 126 or received through the one or more inputs 122 or both. The set top box 120 may include a remote control 128 for remote interaction with the viewer.

The presentation device 104 may include one or more inputs 130 for receiving information from the receiver and an electronic device 132 for receiving information from the one or more inputs 130 and transmitting the information to a display screen, speaker, or other output 134. The presentation device 104 may be a television, computer monitor, or other device for presenting a viewer with visual and audio stimuli.

The reader 106 may be a remote device configured for optically scanning information from the presentation device 104. The reader 106, like the receiver 102 described above, may also be a computer-type device having one or more inputs, a processor, a computer readable storage medium, and one or more outputs. One of the inputs of the reader 106 may include an optical receiver configured for receiving and recording light patterns. The optical receiver may be a digital optical receiver similar to that found in digital cameras and some mobile phones. In some embodiments, the reader 106 may be in the form of a personal digital assistant (PDA), a portable computing device, a table computer, a smartphone and the like. The reader 106 may receive image input, for example, from the optical receiver and the processor may access processing instructions for the image from the computer readable storage medium. That is, in some embodiments, the reader 106 may have decoding software stored in the storage medium for decoding matrix codes. In some embodiments, the software may include an auto run feature when a matrix code is scanned. The processor may process the image produced by the optical receiver and may follow additional instructions produced by the processing of the image.

The reader 106 may have internet access capability via a wireless telephone network, hardwired connection, WiFi access, or another network connection. In following instructions provided by the storage medium or, for example, from a processed image, the reader 106 may access the internet 108 and conduct additional activities by interacting with web-based systems 110 or other network connected systems 110.

Figure 2:
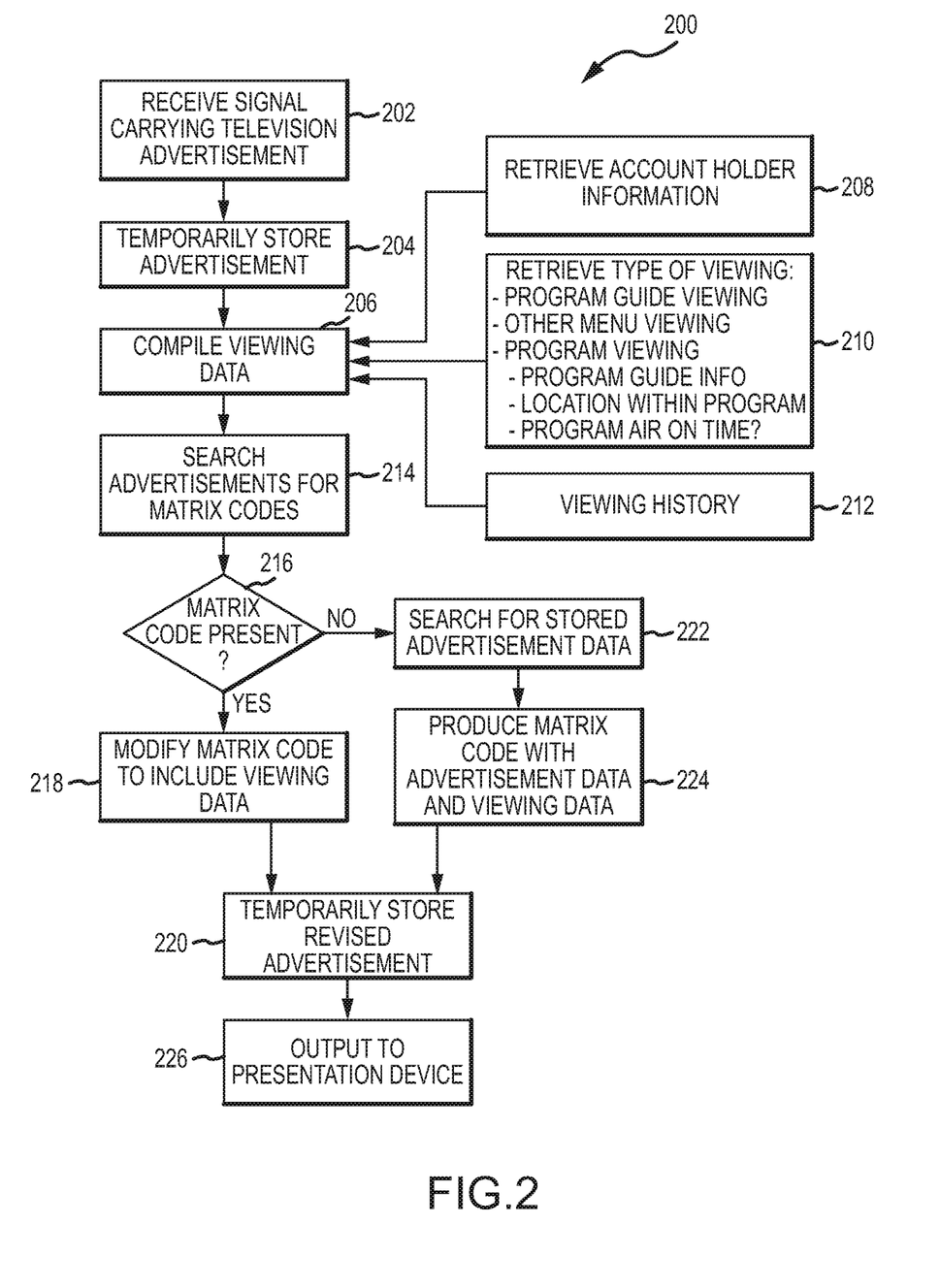
FIG. 2 is a flow chart illustrating a method for including advertisement viewer data in an advertisement performable by all or a portion of the system of FIG. 1.

Having described a system 100 upon which the current method may be performed, reference is now made to FIG. 2, which generally illustrates a method 200 for collecting advertisement viewer information using matrix codes. The method 200 may be performed by all or a portion of the system 100 of FIG. 1. The method may also be performed by other systems. In the embodiment shown in FIG. 2, the receiver 102 may receive a signal carrying an advertisement (202). As mentioned, the signal may be a television broadcast signal carrying a live program, or it may be a signal carrying a program guide or other menu. A plurality of operations may occur within the receiver 102 and the receiver may then output the advertisement, separately or as part of a program, menu, or other presentation, to the presentation device for viewing (226). The presentation device 104 may receive the advertisement from the receiver 102 and display the information on a screen in addition to producing audio signals through a system of speakers. As will be described, the advertisement may include matrix codes allowing scanning by the viewer with a reader 106 as described with respect to FIG. 1 above and the reader 106 may then perform functions, or be instructed to do so, based on the information in the matrix codes. Before getting to the actual operations performed by the receiver 102, additional information is being provided with regard to the advertisements, the matrix codes included therein, and the information in the matrix codes.

The received signal may be any signal having advertisements, or spaces for advertisements, incorporated therein. The advertisements may be in the form of commercials that interrupt programming. Other advertisements may include banner ads that scroll or otherwise appear at a bottom, top, side, or corner of a screen, for example, during programming or while viewing a program guide, menu, or other display available from a service provider. Still other advertisements may include standing or intermittent logos present during programming, on the program guide, menu, or other display. The advertisement may include a matrix code, such as a QR code, that is presented to the user for viewing and/or scanning. The matrix code may be visible throughout the timed length of the advertisement or it may be appear for a shorter period of time. In some embodiments, a prompt may be incorporated into the advertisement indicating when the matrix code will appear such that a viewer may be ready to scan the code.

An exemplary matrix code 140, as depicted in FIG. 1, is a 2-dimensional display (such as a QR code) defining patterns and regions that embody data, similar to a bar code. The matrix code 140 may take the form of alternating black and white elements, such as squares or other geometric shapes. The 2-dimensional nature of the display may generally allow for more data to be stored than a typical bar code. While the present disclosure is related to the use of 2-dimensional matrix codes 140, other data storing/displaying images or systems may also be used. For example, holographic images allowing for 3-dimensional storage of data may be used, as may changing images that allow for recording and/or display of information over time. Each of these and other methods for storing information in a display may be used and are considered to be included in the term "matrix code" 140.

The matrix codes 140 in the present embodiment may store advertisement data and/or viewing data. The advertisement data may relate to the advertised product or service, while the viewing data may pertain to who, when, where, and under what circumstances the particular advertisement was viewed and scanned. The advertisement data may, for example, include a Uniform Resource Locator (URL) allowing the reader 106 to access a corresponding website via the internet 108. The website may include additional information regarding the product or service in the advertisement. For example, the additional information may include product descriptions, ordering options, sample ordering options, coupons, or other information or incentives. The advertisement data may alternatively or additionally include a pre-prepared text message configured to be sent by the reader 106 prompting an advertiser to contact the viewer with additional information or incentives. In other embodiments, the advertisement data may include executable code that, when processed by the reader 106, causes the reader 106 to execute the program and perform an activity. For example, the executable code may run an advertisement on the reader 106 that is the same or different from the advertisement from which the matrix code was scanned. In other embodiments, the executable code may present the viewer with a survey on the reader 106 and may further store the results and send the results to the advertiser. Other types of advertisement data may be included in the matrix code 140 and may be particularly configured to entice viewers of television to scan the codes when viewing advertisements. The enticement may be by way of cost savings, convenience, or other benefits flowing to the viewer who scans the matrix code.

The advertisement data may be supplied by the advertiser. For example, a manufacturer of a product may produce, or have produced, an advertisement for its product. At the time of producing the advertisement, a matrix code 140 and any associated prompts, highlights, or other features to encourage viewers to scan the matrix code 140 may be included in the advertisement. When a network or other program providing entity assembles programming they may include the advertisement in their programming. Accordingly, the receiver in the system above may receive the advertisement together with the program being provided by the broadcasting network. In other embodiments, a service provider may coordinate the inclusion of advertisements in a program or in a program guide or other menu. Without more, the advertisement may run with the program or menu and if scanned by a viewer, the advertisement data may be decoded and actions may be taken by the reader 106 according to the advertisement data.

In other embodiments, the advertisement data may be supplied to the receiver 102, which in turn may construct a matrix code to be displayed with the advertisement. That is, the receiver 102 may include advertisement data corresponding to a list of known advertisers stored in the computer readable storage medium 126. For example, the receiver 102 may have a URL address stored in a database and associated with a corresponding advertiser. When the receiver 102 receives a signal that includes advertisements for the advertiser, the receiver 102 may overlay the particular advertisement with a matrix code 140. The matrix code 140 may include the stored advertisement data, such as the URL address. Thus, where advertisers have not supplied their own matrix codes 140 with advertisement data, the receiver 102 may be capable of doing so. In still other embodiments, the matrix code 140 with advertisement data may be provided by a television network or a satellite service, cable service, or other television service provider.

As indicated, the matrix code 140 presented on the presentation device 104 may also include viewing data in addition to the advertisement data. The viewing data may include information about the account holder such as a business entity or household or a particular set top box within the entity or household. The viewing data may also include program guide information such as the channel, the date, and/or the time that a particular program associated with an advertisement is scheduled to be run. Where a particular program is delayed or otherwise not run on time, the actual time it was run may also be included in the viewing data. In addition, the type of viewing that was occurring when the matrix code was scanned may be provided. That is, the matrix code may include information relating to whether the program was being watched live or in a time-shifted manner such as by being replayed from a digital video recorder or other time-shifting device or system. Where the matrix code 140 is scanned during a time-shifted viewing, the actual date and time of the viewing may also be included. The types of viewing may also include viewing the advertisement while reviewing the program guide or navigating other menus, for example. The viewing data may also include information about the type of advertisement or the particular advertisement that was scanned. Still further, the viewing data may include, for example, a viewing history reflecting the path that a viewer followed prior to getting to the particular channel, program, or advertisement that they were viewing when they scanned a matrix code 140. The viewing history may include the channels that were viewed prior to the current channel, the amount of time spent on each of the previous channels and whether, or in what way, the program guide was used to arrive at the channel, program, or advertisement being viewed and associated with the matrix code. Any or all of this viewing data may be used by the set top box 116 to construct the matrix code 140 for display with or otherwise in relation to an advertisement.

The viewing data may also include instructions to be performed by the reader 106 to allow the viewing data to be sent, captured, and stored for later analysis. For example, the viewing data may include instructions for auto-generating an e-mail, text, telephone call, or other transmission to transmit the viewing data to a server having a database for storing the viewing information. Other instructions may include URL information for the reader 106 to access the internet and provide the information to a server via a website or other network interface.

As described above, the advertisement data may direct the reader 106 to an advertiser's website, for example, and the viewing data may direct the reader 106 to report the viewer information. In some embodiments, the advertisement data and the viewing data may instead operate together to report the information scanned by the reader 106. For example, in one embodiment, the viewing data may include a URL to a web interface for a reporting server allowing a reader 106 to go to the reporting server and report both the viewing data and the advertisement data. In this embodiment, the reporting server may record and store the viewing data and redirect the reader 106 to an advertiser's website based on the advertisement data provided. In another embodiment, the advertisement data my include a URL to a web interface for an advertisers server. The reader may follow the URL to the advertisers server and provide both the viewing data and the advertiser data and the advertiser server may act on the advertiser data while also sending the viewing data to a reporting server.

The viewing data may be supplied by the receiver 102 and may be stored in the computer readable storage medium 126 thereof. The receiver 102 may be associated with a television service provider such as a satellite or cable provider. Accordingly, the receiver 102 may have information stored therein about the associated account holder and/or its location. The information may include an address, age (e.g., of the named party on the account), family type such as single, married, children, and/or cultural demographic information, ZIP code and the like. In addition, each set top box 116 may include a particular serial number or access card distinguishing the box 116 from the other boxes 116 associated with a particular account. This account information may be stored in a computer readable storage medium 126 within the box 116 and be available for including in the viewing data. The receiver 102 may be time enabled such that it may provide time and date information regarding the program. The time information may include the time and date of the originally aired program as well as the time and date when the program was actually viewed, for example, when a time-shifting device is used or when programming is delayed. The time information may also provide for determining where within a given program a particular advertisement was shown. For example, when an 8:00 pm program is run, the receiver may provide information for a particular advertisement that was run at 8:45 pm, indicating either that the advertisement was shown during a particular commerical block (for example, at the ¾ point of the program) or at an absolute time (e.g., 8:45 PM MST). In another example, the receiver 102 may indicate that a particular advertisement was shown during the 5th commercial break or the final commercial break, thereby allowing collectors of the information to determine which portions of a program are more apt to have respective advertisements viewed. The receiver 102 may also have a tracking module configured to keep track of the viewing history on a particular set top box 116 for a particular sitting or over a range of sittings and store them in the computer readable storage medium 126.

In alternative embodiments, the viewing data, or portions thereof, may be provided by a television network or other content creator. That is, when the network develops a particular program schedule, the network may be able to include or modify matrix codes 140 in advertisements to include the program information pertaining to the advertisement. In still other alternatives, a television service provider may provide the viewing data. In these two alternative cases, the viewing data available prior to broadcasting the program may not include the level of detail described above. For example, at the time of broadcasting, the network or the service provider may not have information regarding whether the program is viewed live or time shifted. These entities may also not have viewing history information for particular viewers. As such, the viewing data available to be provided by these entities may be more limited.

When the receiver 102 supplies the viewing data, the receiver 102 may insert a matrix code 140 in an advertisement that does not already have a matrix code 140 or it may modify the matrix code 140 of advertisements already having a matrix code 140. When the matrix code 140 is not already provided, the receiver 102 may read the viewing data from the computer readable storage medium 126, generate a matrix code 140, and run it, together with any prompts or other information, concurrently with the advertisement. This may include providing a banner along the bottom, top, side, or corner of a display during the advertisement that displays the matrix code and further instructs the viewer to scan the code with, for example, their smartphone. When the matrix code 140 is already provided in an advertisement, the receiver 102 may modify or replace the matrix code 140 such that it may include the viewing data. This may involve modification of the matrix code 140 such that the advertisement data in the code 140 remains and the viewing data is read from the computer readable storage medium 126 and added to the matrix code 140. The modified matrix code 140 may then be run in place of the originally provided matrix code 140. In some embodiments, the receiver 102 may read the matrix code 140 and create a new matrix code 140 including the advertisement data provided by the advertisers matrix code 140 and the viewing data provided by the receiver 102. The receiver 102 may then overlay the new matrix code 140 over the advertiser supplied matrix code 140 for display to the viewer. This latter approach may allow a television service provider to exercise more control over the appearance and capability of matrix codes 140 displayed by their service. This may allow for proprietary forms of matrix codes 140 to be used by several television service providers.

In each of the above cases when a matrix code 140 is provided and is modified, or when a matrix code 140 is absent and is produced, the receiver 102 may rely on matrix code software stored therein. The software may include a matrix code development module for developing matrix codes and incorporating data therein. The software may further include a matrix code decoding software for decoding matrix codes already present in a program. The software may also include a matrix code editing module for modifying or editing matrix codes 140 to add or remove data therefrom.

With this background, the particular operations that the receiver 102 may take between receiving a signal (202) and transmitting an advertisement to a presentation device 226 may be described in more detail. Having received a signal carrying an advertisement (204), the receiver 102 may temporarily store the advertisement (204) in a computer readable storage medium 126.

Upon locating or recognizing an advertisement, viewing data related to the advertisement may be compiled (206) by reading the viewing data from the computer readable storage medium 126. This may include retrieving account holder information (208) regarding the receiver receiving the signal. In some embodiments, set top box information within an account may be provided. That is, when a receiver includes set top boxes located in particular locations in a household or having particular serial numbers or access cards, this information may be retrieved. The compiling operation may also include retrieving the type of viewing (210) such as whether the advertisement is included in a program or within the program guide or another menu. When the type of viewing of the advertisement is with a television program, additional information such as the program guide information may be retrieved. The location of the advertisement within the program may also be retrieved. This may be determined based on the current time relative to the start time of the program, or by continually monitoring advertisement breaks in programming and determining which break the current advertisement is located in, or other methods. Other viewing data available at the time of receiving the broadcast may also be compiled during this operation. For example, whether the program aired on time, early, or delayed may be retrieved by comparing the beginning start time of the program to the program guide information.

The viewing history may be compiled (212) by the tracking device mentioned and when the advertisement is part of a broadcast television program, the incoming advertisement may reflect that the current viewing history lead to the review of the incoming advertisement. However, when the advertisement is part of a menu, the timing of the incoming advertisement and the viewing thereof may not correspond. That is, the signal carrying the advertisement in a menu may be received at a time other than when the menu is reviewed by the viewer. In this case, the viewing history may need to be updated at the time of viewing of the advertisement in the menu similar to advertisements viewed in a time shifted television program, which is discussed with respect to FIG. 3 below.

Having compiled the available viewing data, the located or recognized advertisement may be searched for a matrix code 140 or codes (214). Depending on whether an initial matrix code is present, the receiver may compile a matrix code 140 by performing differing operations (216). For example, when an initial matrix code is present, the receiver may compile a matrix code 140 by first utilizing a decoding software module stored on the storage medium to decode the initial matrix code. The receiver 102 may then rely on an editing software module to modify the initial matrix code to include the compiled viewing data (218) and create a matrix code 140. Once modified, the advertisement with the modified matrix code 140 may be temporarily stored (220) as a revised advertisement. In another example, when an initial matrix code is not present, the receiver 102 may compile a matrix code 140 by creating one. In this example, the receiver 102 may search a database within the receiver 102 or via a network such as the internet for advertisement data consistent with the advertisement in the broadcast (222). For example, the receiver may obtain a web address for a manufacturer of a the product being advertised in the advertisement. The receiver may then rely on a matrix code development module to produce a matrix code 140 including both the searched for advertisement data and the compiled viewing data (224). Once the matrix code 140 is compiled, it may be associated with the advertisement and the advertisement may be temporarily stored as a revised advertisement (220). In cases when the receiver 102 is not equipped with digital video recording capabilities or other time shifting devices or systems, the revised advertisement may be output to the presentation device 106 for viewing and potential scanning by a viewer.

Figure 3:
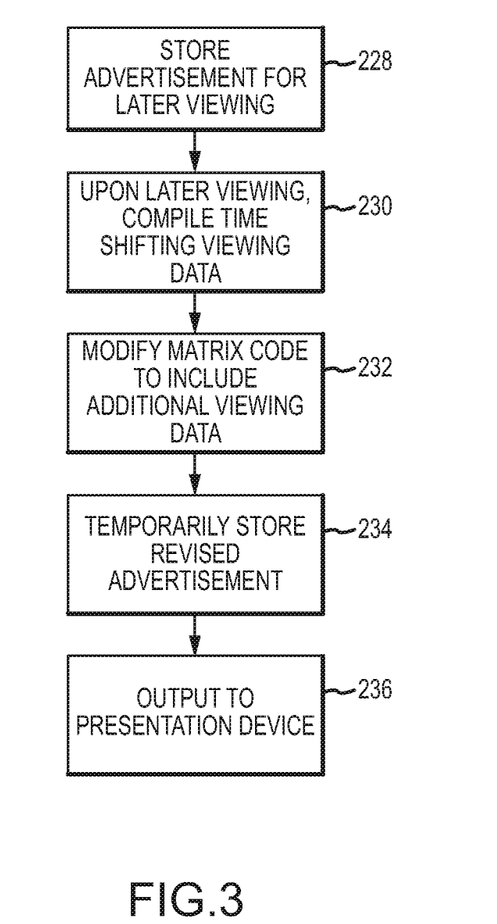
FIG. 3 is a flow chart illustrating a method for supplementing advertisement viewer data when an advertisement is viewed in a time shifted manner also performable by all or a portion of the system of FIG. 1.

Referring now to FIG. 3, where digital video recording is available, the receiver 102 may record a revised advertisement (228) as it is output to the presentation device 106 at, for example, operation 220. As such, when the advertisement is recorded, the advertisements may be recorded with matrix codes 140 included having advertisement and viewing data stored therein. Upon later viewing of the advertisement by viewing the associated television program, additional viewing data may be compiled relating to the time shifting of the program (230). That is, the time and date of the time shifted viewing may be compiled. The receiver 102 may then search the stored advertisement matrix codes 140 and modify them to include the additional viewing data regarding the time shifted nature of the program viewing (232). The receiver 102 may then temporarily store the additionally revised advertisement (234) and output the revised advertisement to a presentation device (236).

Similarly, when the advertisement is viewed in a program guide or menu, accessing the program guide may trigger a viewing data update. Matrix codes 140 included in advertisements within the program guide or menu may thus be updated with viewing history information, for example, each time the program guide or menu is accessed. Accordingly, when a viewer scans a matrix code 140 in a program guide or menu, the matrix code 140 may be current with respect to the viewing history leading to the viewing of that particular advertisement. When, for example, the program guide or menu includes a rolling series of advertisements, the update may occur for each advertisement when the program guide or menu is accessed or the update may occur as each advertisement is presented for viewing.

Once a program including matrix codes 140 has been output to a presentation device 104, a viewer may scan a matrix code when it is presented on the presentation device 104. The matrix code 140 may have advertisement data and viewing data stored therein. The viewer may direct the optical receiver portion of a reader 106 toward the presentation device 104 when the presentation device 104 is displaying a matrix code 140. The viewer may then actuate the optical receiver by, for example, depressing a shutter button. The reader 106 may thus capture an image of the matrix code 140. In some embodiments, the viewer may zoom, focus, or otherwise direct the reader toward the portion of the presentation device displaying the matrix code.

As mentioned above, the reader 106 may include an auto run feature causing the reader 106 to begin the decoding process when a matrix code 140 has been captured. In other cases, the viewer may positively select a software on the reader 106 and direct the software to decode the captured image of the matrix code 140. The software may decode the image thus producing the advertisement data and the viewing data. Depending on the nature of the data, the processor may automatically follow instructions provided by the advertisement and/or viewing data. For example, when the reader 106 has Internet connectivity, the advertisement data may include instructions for the processor to launch a web browser and browse to a particular URL address causing a website with information relating to the advertisement to appear on a display of the reader 106. The viewer may then view the website and interact with the website as desired. The viewing data may include instructions for the processor to compile and send an e-mail to a server for collection of the viewing data. The e-mail may be received by the server and data from the e-mail may be stored in a database for later analysis and study.

The matrix codes 140 including the advertisement data and viewing data may allow for the collection of the type of information that is of interest to television networks or other media organizations. For example, the viewing data may be helpful to networks in establishing billing rates for commercials. That is, for example, when it turns out that there is more scanning activity for commercials near the beginning, middle, end, or final commercial break of a program, the rates for placement of a commercial in these slots may be increased. On the other hand, the information may be valuable to advertisers who may want to get a discounted rate for advertising during a heavily viewed program. That is, the advertiser may suggest that, while it is a highly rated program, the first commercial slot is not often heavily viewed and as such, the advertiser should receive a lower rate than other slots during the program. Generally, the availability of the information provided by the viewing data included in the advertisements may allow for more information regarding viewing habits of television watchers and thus more educated discussion about rates for running commercial television advertisements.

In addition, the data may also be more refined based on the account holder information and advertising costs may be tailored toward, not only time, but also particular markets where, for example, households or business entities watch less or pay less (or more) attention to television. Similar positions may be taken by the networks and the advertisers to attempt to find a position they are each comfortable with in paying and charging for advertising.

Still further, the above described embodiments may allow for some level of targeted advertising. That is, when a particular type of advertisement is commonly scanned by a viewer within a particular entity or household, a television service provider may be able to tailor the advertising being provided in the broadcasts sent to that entity or household based on the entities account number and its history of scanned matrix codes relating to particular types of products. On a more detailed level, the television service provider may also be able to tailor the advertising being provided on each set top box within the entity or household based on the serial number or access card information associated with each set top box and that particular box's history of scanned matrix codes relating to particular types of products.

In some embodiments of the present disclosure, the viewing data described above may be further directed toward identifying the particular individuals that are viewing advertisements. That is, while the above described viewing data may be capable of identifying a particular household or entity and a particular set top box within that household or entity, the above listed viewing data may not fully indicate which particular individual is scanning a given matrix code. In the present embodiment, the viewing data may include a further mining instruction for gathering data from the reader 106 used to scan the subject matrix code 140. That is, the viewing data may include an instruction to the reader 106 to provide its phone number, serial number, or other identifier of the particular reader 106 used to scan the matrix code 140. In some embodiments, the reader 106 may include software particularly adapted for scanning matrix codes 140 from presentation devices and the software may include a permissions feature allowing the user of the reader 106 to prevent or allow access to some or all information on the reader 106. The information retrieved from the reader 106 may be added to the viewing data gleaned from the matrix code 140 and included therewith when reporting the viewing data to a reporting server, for example.

This latter embodiment may allow for more refined targeted advertising. That is, the identifier of the reader 106 may allow a television service provider to track times, for example, when the particular individual associated with the identifier is watching a particular set top box within a household. As such, the service provider may target advertising toward that individual and a particular set top box during timeframes when this particular individual typically watches television on that box. More particularly, for example, the service provider may target advertising to teenagers on a living room set top box during the day and to an alternative set top box in the evening, when, for example, their parents may be using the living room television. Still further, the service provider may dynamically change the advertising being sent to a particular set top box when a matrix code is scanned and the reporting server receives an indication that the user associated with the identifier is watching a given set top box. This may also include situations when the user is watching a set top box outside of their account such as when they are at another persons home or at a another entity for example. This may be based on the assumption that the demographic of viewers at a given location and viewing time is likely to be relatively consistent with the person scanning a matrix code 140 in an advertisement.

In still other embodiments, the matrix codes 140 having the viewing data described may allow for informing an account holder of the types of programs and advertisements that are being viewed on their account. That is, for example, in the context of parental discretion, a service provider may be able to report to an account holder that matrix codes 140 were scanned from a particular channel at a given time or that matrix codes relating to particular advertisements were scanned. This may allow an account holder to monitor the types of television being viewed within their entity or home, for example.

In the present disclosure, the methods disclosed may be implemented as sets of instructions or software readable by a device. Further, it is understood that the specific order or hierarchy of operations in the methods disclosed are examples of sample approaches. In other embodiments, the specific order or hierarchy of operations in the method can be rearranged while remaining within the disclosed subject matter. The accompanying method claims present elements of the various operations in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

The invention claimed is:

1. A method for collecting advertisement viewer information comprising:
   receiving a signal carrying an advertisement included in a broadcast television program, wherein the advertisement includes an initial QR code or bar code having advertisement data;
   reading viewing data associated with the advertisement from a computer readable storage medium, wherein the viewing data comprises program information including the date and time the broadcast program was scheduled to air, wherein the viewing data includes location information regarding the timing of when the advertisement was played during the television program as well as whether the signal carrying the advertisement was being watched live or in a time-shifted manner, wherein the location information includes a percentage of the length of the program, and wherein when the program was time-shifted the viewing data further includes the date and time of the viewing;
   transmitting the viewing data to a database;
   compiling a QR code or bar code by modifying the initial QR code or bar code to generate a QR code or bar code including the viewing data and maintaining the advertisement data for inclusion in the advertisement and scanning by a viewer; and
   transmitting the advertisement with the QR code or bar code to a presentation device for display.

2. The method of claim 1, wherein the QR code or bar code further includes advertisement data.

3. The method of claim 2, wherein the advertisement data includes additional information about an advertised product or service.

4. The method of claim 3, wherein the additional information includes a video.

5. The method of claim 3, wherein the additional information includes an internet link to a product website.

6. The method of claim 1, wherein the viewing data includes account information.

7. The method of claim 1, wherein the location information includes whether the advertisement is positioned toward the beginning, middle, or end of the program.

8. The method of claim 1, wherein the location information includes a number of the commercial break in which the advertisement is positioned.

9. The method of claim 1, wherein the viewing data includes an indication regarding whether the broadcast television program was viewed live or time-shifted.

10. The method of claim 1, wherein the transmission to the database includes a method of preparing a text message including the viewing data and sending the text message to the database.

11. The method of claim 1, wherein the transmission to the database includes a method of preparing an e-mail including the viewing data and sending the e-mail to the database.

12. The method of claim 1, wherein the transmission to the database includes a method of accessing an internet web interface and entering the viewing data into the interface.

13. The method of claim 1, wherein the viewing data includes instructions for auto-generating an e-mail, text, telephone call to transmit the viewing data to a server having a database for storing the viewing information.

14. The method of claim 1, wherein when the viewing data includes information that the broadcast signal including the advertisement was being watched in a time-shifted manner, the viewing data further includes the actual time and date that the broadcast signal including the advertisement was watched.

15. A system for including advertisement viewer information in a QR code or bar code, comprising:
   a receiver comprising:
   an input that receives a broadcast television program including an advertisement;
   a computer readable storage medium having viewing data associated with the advertisement stored therein and instructions for compiling QR codes or bar codes to include the viewing data and for transmitting the viewing data to a database;
   a processor that receives the advertisement, reads the viewing data from the computer readable storage medium associated with the advertisement, and performs the instructions to compile a QR code or bar code to include the viewing data, wherein the advertisement includes an initial QR code or bar code having advertisement data and the processor compiles the QR code or bar code by modifying the initial QR code or bar code to include the viewing data and maintain the advertisement data, wherein the viewing data includes program information including the name of the program and the date and time it was scheduled to air, wherein the program information also includes location information including a percentage of the length of the program, wherein the viewing data includes whether the broadcast signal including the advertisement was being watched live or in a time-shifted manner, and wherein when the program was time-shifted, the viewing data further includes the date and time of the viewing; and
   an output that transmits the television program to a presentation device.

* * * * *